United States Patent
Deaver et al.

[11] Patent Number: 6,108,391
[45] Date of Patent: Aug. 22, 2000

[54] APPARATUS FOR PERFORMING JET PUMP RISER PIPE REPAIRS

[75] Inventors: Gerald A. Deaver; David B. Drendel; Siamak Bourbour, all of San Jose; Leonard John Sharpless, Palo Alto; Arunachalam Mahadevan, San Jose, all of Calif.

[73] Assignee: General Electric Company, Schenectady, N.Y.

[21] Appl. No.: 09/255,266

[22] Filed: Feb. 23, 1999

Related U.S. Application Data
[60] Provisional application No. 60/078,913, Mar. 20, 1998.

[51] Int. Cl.$^7$ ..................................................... G21C 19/00
[52] U.S. Cl. .......................... 376/262; 376/260; 376/407; 376/372
[58] Field of Search ............................ 376/407, 260–263, 376/372

[56] References Cited

U.S. PATENT DOCUMENTS

| | | |
|---|---|---|
| 2,440,864 | 5/1948 | Liss . |
| 4,640,531 | 2/1987 | Forster et al. ............................. 285/24 |
| 4,652,023 | 3/1987 | Timmons . |
| 4,675,149 | 6/1987 | Perry et al. ............................... 376/260 |
| 4,709,729 | 12/1987 | Harrison . |
| 4,859,403 | 8/1989 | Dixon et al. ............................. 376/286 |
| 5,646,969 | 7/1997 | Jensen ...................................... 376/260 |
| 5,735,551 | 4/1998 | Whitman et al. .......................... 285/15 |

FOREIGN PATENT DOCUMENTS

| | | | |
|---|---|---|---|
| 5-203787 | 8/1993 | Japan | 376/262 |
| 6-160579 | 6/1994 | Japan | 376/262 |
| 10-206587 | 8/1998 | Japan | 376/262 |

OTHER PUBLICATIONS
European Search Report, 2 pgs., dated Jun. 23, 1999.

*Primary Examiner*—Charles T. Jordan
*Assistant Examiner*—Jack Keith
*Attorney, Agent, or Firm*—Armstrong Teasdale LLP

[57] ABSTRACT

Apparatus for supporting the lower elbow assembly of a jet pump in a reactor pressure vessel (RPV) of a nuclear reactor are described. The clamp apparatus includes a lower clamp element and an upper clamp element. The upper and lower elements are configured to be positioned at the interface between the thermal sleeve and the jet pump riser elbow. The upper and lower elements include extended ridges that are configured to fit in circumferential grooves precisely machined into the sleeve-elbow assembly on opposing sides of the interface.

17 Claims, 4 Drawing Sheets

APPARATUS FOR PERFORMING JET PUMP RISER PIPE REPAIRS

CROSS REFERENCE TO RELATED APPLICATIONS

This application claims the benefit of U.S. Provisional Application No. 60/078,913, filed Mar. 20, 1998.

BACKGROUND OF THE INVENTION

This invention relates generally to nuclear reactors and, more particularly, to apparatus for repairing jet pump riser assemblies within a nuclear reactor pressure vessel.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core plate and is supported by a shroud support structure. Particularly, the shroud has a generally cylindrical shape and surrounds both the core plate and the top guide.

Water enters the RPV through an inlet nozzle in the RPV sidewall. As is well known, a jet pump riser assembly is coupled to the inlet nozzle and the jet pump riser assembly typically includes, in part, a thermal sleeve, a lower elbow and a riser pipe. The thermal sleeve extends through the inlet nozzle and is welded to one end of the elbow. The other end of the elbow is welded to the riser pipe. The riser pipe is positioned between and extends substantially parallel to the RPV sidewall and the shroud.

During operation, the jet pump assembly directs recirculation flow within the RPV. Accordingly, substantial amounts of water are forced through the jet pump assembly and significant hydraulic forces are exerted on the jet pump assembly, including on the jet pump assembly elbow. Furthermore, and during operation, a large amount of heat is generated within the RPV, thus placing thermal stress on the jet pump assembly. These hydraulic forces and thermal stresses can increase the susceptibility of metal in the jet pump riser assembly to Intergranular Stress Corrosion Cracking (IGSCC), and in extreme cases the riser pipe could separate from the thermal sleeve which is undesirable.

It would be desirable to provide an apparatus which provides support for a jet pump riser assembly. It also would be desirable to provide such an apparatus which is easy to install.

BRIEF SUMMARY OF THE INVENTION

These and other objects are attained by a clamp apparatus which, in one embodiment, is configured to be secured at the interface between the thermal sleeve and the jet pump riser elbow. The clamp apparatus restrains the jet pump components at the clamp location and maintains the vibrational characteristics of the jet pump.

The clamp apparatus includes, in one embodiment, a lower clamp element and an upper clamp element. The upper and lower elements are U-shaped and are configured to be positioned on opposing sides of the interface between the thermal sleeve and the jet pump riser elbow. The upper and lower elements include extended ridges configured to fit in circumferential grooves machined into the sleeve-elbow assembly adjacent the interface between the sleeve and the elbow. The sides of the machined grooves are tapered to permit easy fitup and assembly of the clamp apparatus.

The lower clamp element and the upper clamp element are positioned so that the respective ridges extend into respective grooves, and clamping bolts secure, or clamp, the clamp elements to the thermal sleeve and riser elbow at the interface.

By using the above described clamp apparatus, a vibration restraint clamping force is placed on the piping at the welded interface between the thermal sleeve and the jet pump riser elbow. Such vibration restraint maintains the rigidity of the pipe structure and maintains the vibration characteristics of the jet pump. In addition, the clamp apparatus is easy to install.

DETAILED DESCRIPTION OF THE INVENTION

Figure 1:
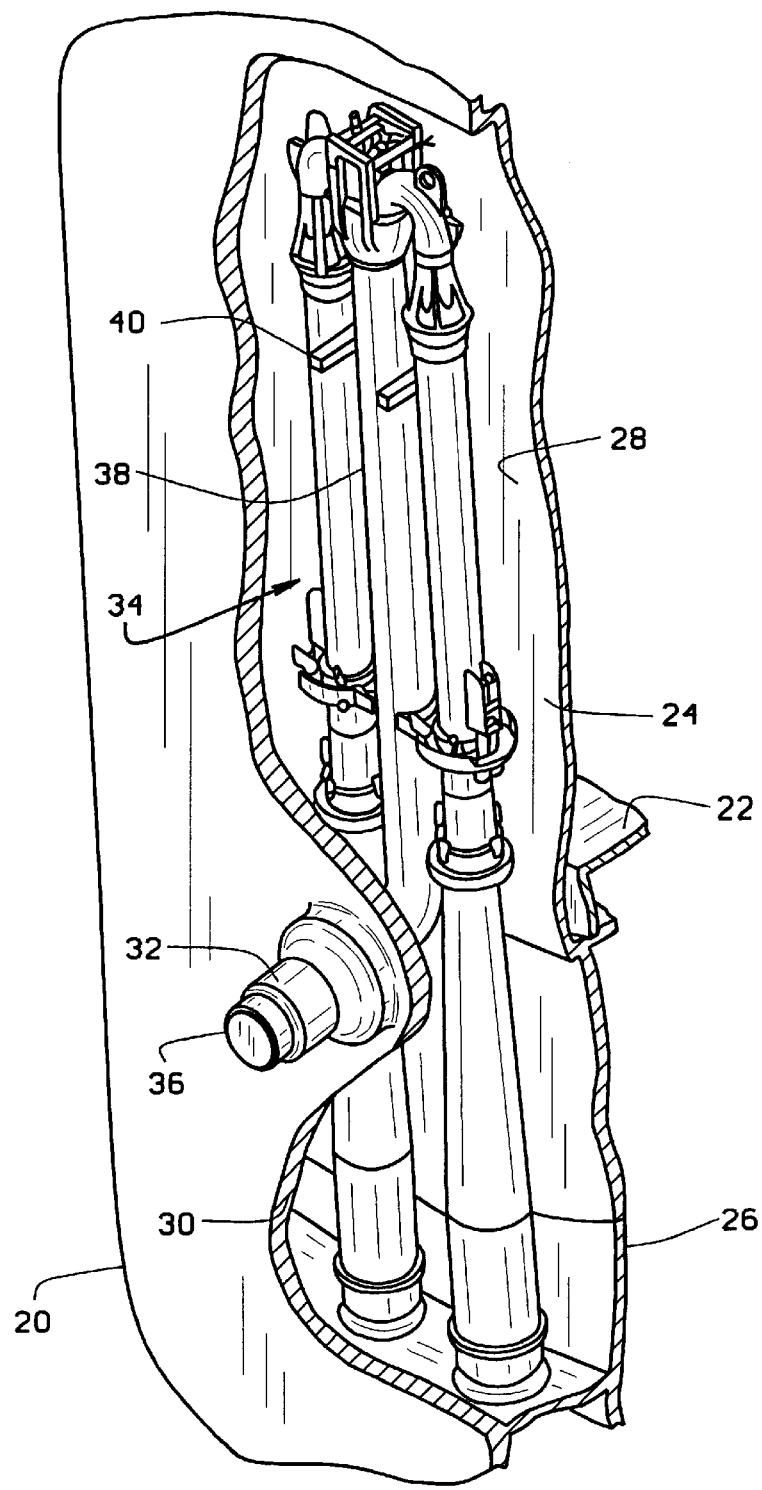
FIG. 1 is a schematic, partial cross-sectional view, with parts cut-away, of a reactor pressure vessel of a boiling water reactor.

FIG. 1 is a schematic, partial cross-sectional view, with parts cut-away, of a reactor pressure vessel (RPV) 20 for a boiling water reactor. RPV 20 has a generally cylindrical shape and is closed at one end by a bottom head and at its other end by removable top head (not shown). A top guide (not shown) is spaced above a core plate 22 within RPV 20. A shroud 24 surrounds core plate 22 and is supported by a shroud support structure 26. An annulus 28 is formed between shroud 24 and sidewall 30 of RPV 20.

An inlet nozzle 32 extends through sidewall 30 of RPV 20 and is coupled to a jet pump assembly 34. Jet pump assembly 34 includes a thermal sleeve 36 which extends through nozzle 32, a lower elbow (only partially visible in FIG. 1), and a riser pipe 38. Thermal sleeve 36 is secured at a first end (not shown) to a second end of the lower elbow. Particularly, the first end of thermal sleeve 36 is welded to the second end of the lower elbow. A first end of the lower elbow is similarly secured, or welded, to one end of riser pipe 38. Riser pipe 38 extends between and substantially parallel to shroud 24 and RPV sidewall 30. A riser brace 40 stabilizes riser pipe 38 within RPV 20. Jet pump assemblies such as assembly 34 are well known in the art, and assembly 34 is illustrated here by way of example only. The present invention can be used with many other jet pump assemblies, and is not limited to use with only assembly 34.

In addition, the present invention is not limited to practice in the boiling water reactor illustrated in FIG. 1, and the present invention could be used in many different reactors having many different alternative configurations. The boiling water reactor of FIG. 1 is illustrated by way of example only and not by way of limitation.

Figure 2:
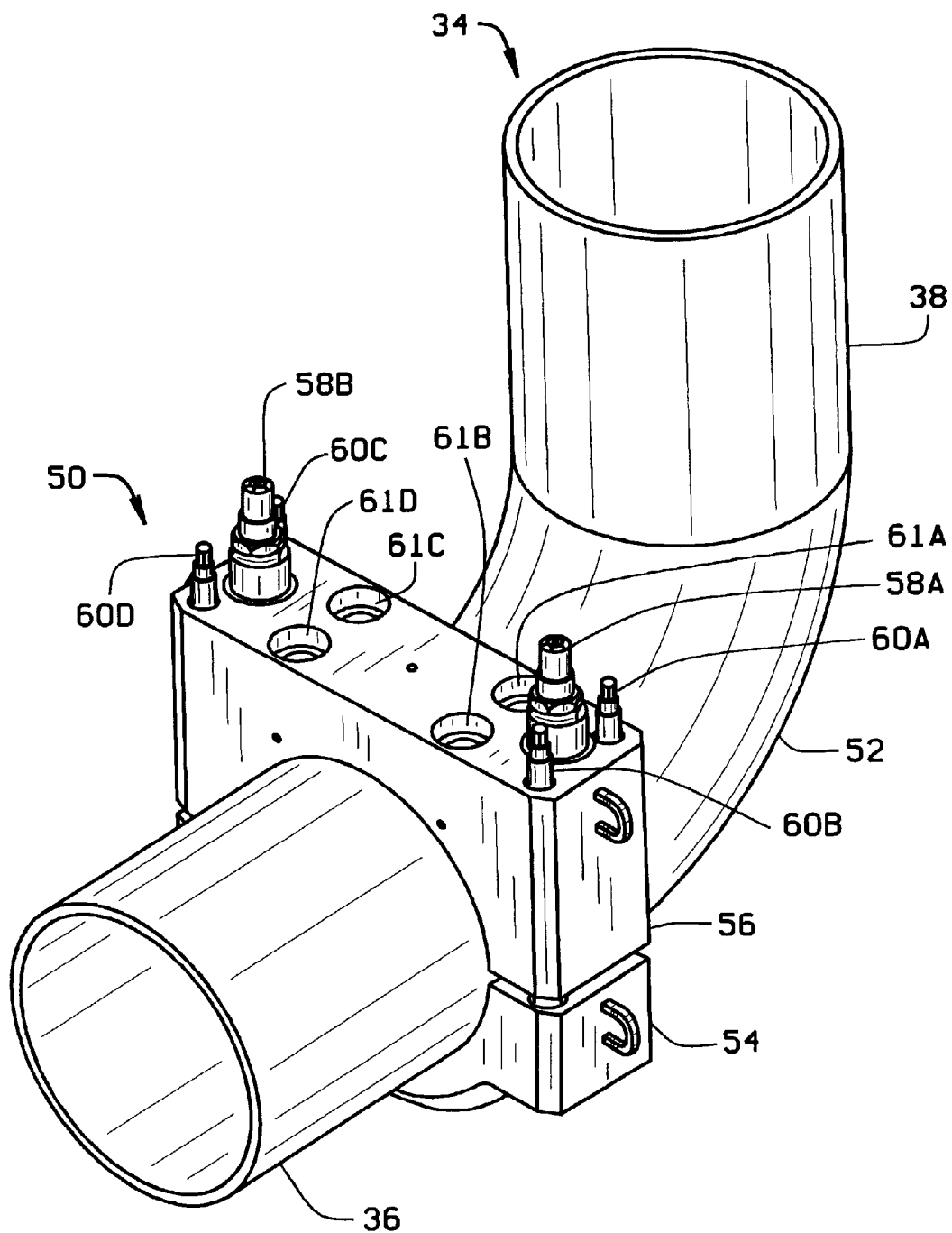
FIG. 2 is a perspective view of a portion of a jet pump assembly and a clamp apparatus in accordance with one embodiment of the present invention.

FIG. 2 is a perspective view of jet pump assembly 34 and a clamp apparatus 50 in accordance with one embodiment of the present invention. Jet pump assembly 34, as described above, includes thermal sleeve 36, riser pipe 38 and a lower elbow 52.

Clamp apparatus 50 includes a U-shaped lower clamp element 54 and a U-shaped upper clamp element 56. Lower element 54 and upper element 56 are configured to be positioned at the interface between thermal sleeve 36 and elbow 52 and to be coupled or clamped together. Two clamping bolts 58A and 58B secure lower clamp element 54 to upper clamp element 56. Stop bolts 60A, 60B, 60C, and 60D prevent excessive crushing of sleeve 36 and elbow 52 after the required, predetermined, initial clamping force is applied. The initial clamping is determined based on a minimum force required for a firm contact between clamp elements 54 and 56 and sleeve 36 and elbow 52. Stop bolts 60A, 60B, 60C, and 60D also provide constraint against relative rotation between upper clamp element 56 and lower clamp element 54.

Figure 3:
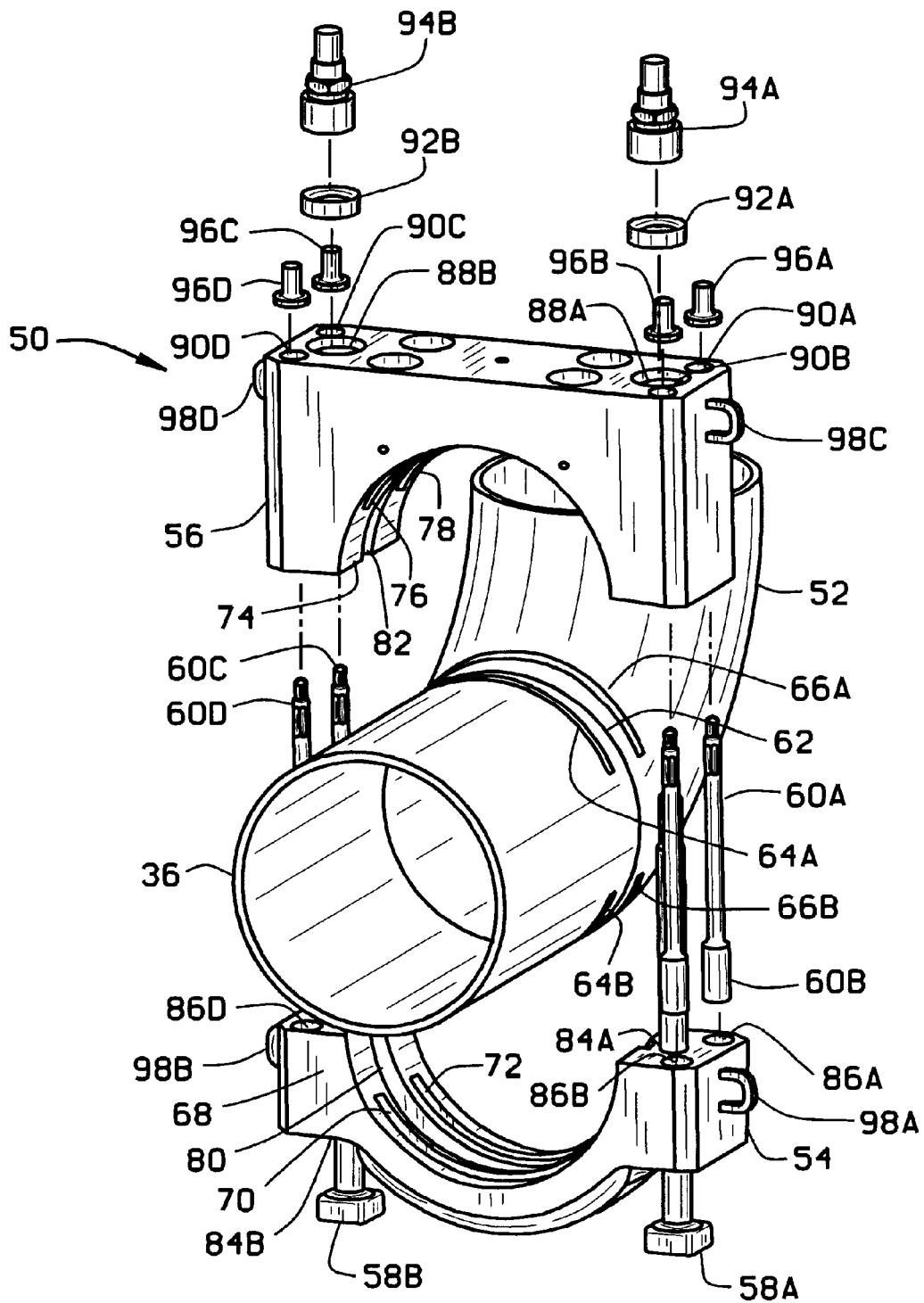
FIG. 3 is an exploded perspective view of the clamp apparatus shown in FIG. 2.

FIG. 3 is an exploded perspective view of clamp apparatus 50 showing thermal sleeve 36 and jet pump riser elbow 52 joined together at interface weld 62. Circumferential grooves 64A and 64B are machined into sleeve 36 at a location adjacent to interface weld 62. Similarly, circumferential grooves 66A and 66B are machined into elbow 52 at a location adjacent interface weld 62. Grooves 64A, 64B, 66A, and 66B are typically machined into sleeve 36 and elbow 52 by an electrode discharge machining (EDM) tool, as explained below in more detail.

A pipe engaging surface 68 of lower clamp element 54 has a substantially semicircular geometric shape, and ridges 70 and 72 extend from surface 68. Ridges 70 and 72 are configured to fit in grooves 64B and 66B respectively. Similarly, a pipe engaging surface 74 of upper clamp element 56 has a substantially semicircular geometric shape, and ridges 76 and 78 extend from surface 74. Ridges 76 and 78 are configured to fit in grooves 64A and 66A respectively. The sides of grooves 64A, 64B, 66A, and 66B are tapered to permit easy fitup and assembly of clamp apparatus 50. Grooves 80 and 82 are machined into surfaces 68 and 74 respectively. Grooves 80 and 82 are configured to fit over interface weld 62 preventing interference of weld 62 with upper element 56 and lower element 54.

In one specific embodiment, ridges 70, 72, 76, and 78 have a height of about 250 mils. The depth of grooves 64A, 64B, 66A, and 66B is between about 120 to 170 mils. In this embodiment, and to preserve the integrity of sleeve 36 and elbow 52, the depth of grooves 64A, 64B, 66A, and 66B should be less than 180 mils.

Heat distortion caused by the welding of sleeve 36 to elbow 52 and by welding elbow 52 to riser pipe 38 may cause an out of round condition of the piping components. To machine grooves 64A, 64B, 66A, and 66B within a desired tolerance, a profile tool may be used to profile the shape of the piping components. The data obtained from the profile tool may then be used to fabricate a form and electrodes for the EDM operation. The form is positioned over the piping and the electrodes providing for the precise machining of grooves 64A, 64B, 66A, and 66B into sleeve 36 and elbow 52. Additionally, the profile data may also be used to fabricate ridges 70, 72, 76, and 78 so that surfaces 68 and 74 closely conform to the pipe components actual profiles.

Lower clamp element 54 also includes clamp bolt openings 84A and 84B, and stop bolt sockets 86A, 86B, 86C and 86D. Upper clamp element 56 includes corresponding clamp bolt openings 88A and 88B, and stop bolt openings 90A, 90B, 90C, and 90D. Clamp bolt 58A extends through openings 84A and 88A, and clamp bolt 58B extends through openings 84B and 88B. Clamp bolts 58A and 58B, with washers 92A and 92B and clamp bolt nuts 94A and 94B clamp elements 54 and 56 to the piping. Stop bolts 60A, 60B, 60C, and 60D fit in sockets 86A, 86B, 86C and 86D respectively, and extend through stop bolt openings 90A, 90B, 90C, and 90D respectively. Stop bolts 60A, 60B, 60C, and 60D are held in place by stop bolt keepers 96A, 96B, 96C, and 96D respectively.

Clamp apparatus 50 further includes four tooling rings 98A, 98B, 98C, and 98D used for installing clamp apparatus 50 from the reactor bridge. Tooling rings 98A and 98B are located on opposing ends of lower clamp element 54, and tooling rings 98C and 98D are located on opposing ends of upper clamp element 56.

To install apparatus 50, circumferential grooves 64A, 64B, 66A, and 66B are machined adjacent interface weld 62 as described above. Ridges 70, 72, 74, and 76 and grooves 80 and 82 are then machined in clamp elements 54 and 56 to match grooves 64A, 64B, 66A, and 66B, and weld 62. Lower clamp element 54 and upper clamp element 56 are positioned over weld 62. Particularly, lower clamp element 54 is located so that weld 62 is positioned in groove 80 and ridges 70 and 72 are positioned in grooves 64B and 66B respectively. Upper clamp element is positioned so that stop bolts 60A, 60B, 60C, and 60D extend through stop bolt openings 90A, 90B, 90C, and 90D respectively. Also, groove 82 is positioned over weld 62 and ridges 74 and 76 are positioned in grooves 64A and 66A respectively. Clamping bolt 58A extends through openings 84A and 88A and is secured with washer 92A and nut 94A. Likewise, clamping bolt 58B extends through openings 84B and 88B and is secured with washer 92B and nut 94B. Stop bolts 60A, 60B, 60C, and 60D are secured with stop bolt keepers 96A, 96B, 96C, and 96D respectively. After the initial clamping force is applied, stop bolts 60A, 60B, 60C, and 60D are advanced until they contact stop bolt sockets 86A, 86B, 86C, and 86D in lower clamp element 54. Stop bolt keepers 96A, 96B, 96C, and 96D are then secured. After stop bolts 60A, 60B, 60C, and 60D are in contact with lower clamp element 54, the clamping force load path is from clamp element 56 to stop bolts to clamp element 54, bypassing sleeve 36 and elbow 54. Additional clamping force using clamping bolts 58A and 58B, and nuts 94A and 94B is applied as needed to resist the applied loads during jet pump operation without over clamping thermal sleeve 36 or elbow 52.

Clamp assembly 50 is useful for repairing a single interface weld, such as interface weld 62 between thermal sleeve 36 and elbow 52, described above. Clamp assembly 50 may also be used to repair the interface between elbow 52 and riser pipe 38. In another embodiment, a second clamp assembly, similar to assembly 50, may be coupled to upper clamp member 56. Particularly, threaded sockets can be inserted into openings 61A, 61B, 61C, and 61D (shown in FIG. 2), and bolts could be used to engage the second assembly to assembly 50. The second clamp assembly would also include opposing clamp elements having extending ridges configured to fit in grooves machined into elbow 52 and riser pipe 38 adjacent to the interface of elbow 52 and riser pipe 38. This configuration could be used if both welds need to be reinforced.

Figure 4:
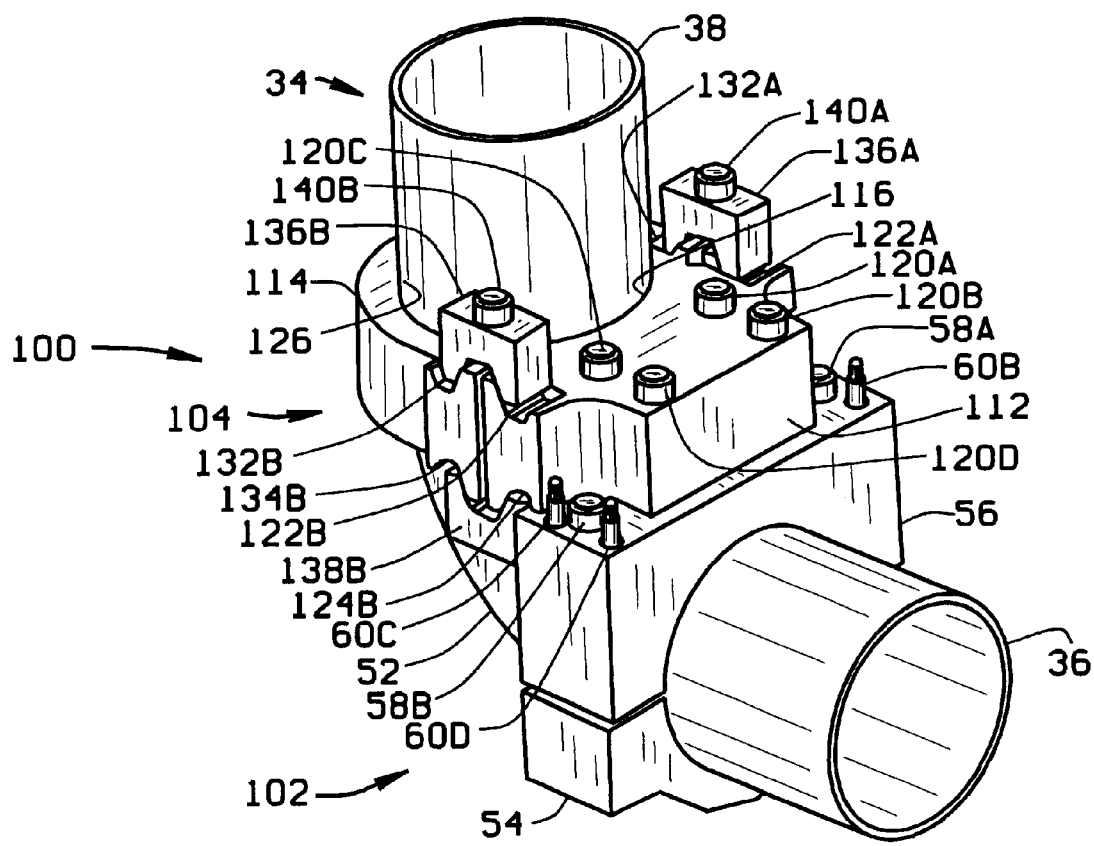
FIG. 4 is perspective view of a portion of a jet pump assembly and a clamp assembly in accordance with another embodiment of the present invention.

A clamp apparatus 100 in accordance with another embodiment of the resent invention is shown in FIG. 4. Clamp apparatus 100 includes a lower elbow clamp assembly 102 and an upper elbow clamp assembly 104. Lower elbow clamp assembly 102 is clamp assembly 50 shown in FIGS. 2 and 3, and includes lower clamp element 54 and upper clamp element 56, described in detail above. Lower element 54 and upper element 56 are clamped together with clamping bolts 58A and 58B, and stop bolts 60A, 60B, 60C, and 60D as described above.

Upper elbow clamp assembly 104 includes a bridge member 112 coupled to upper clamp element 56, and a substantially U-shaped clamping member 114 clamped to bridge member 112. Particularly, bridge member 112 has a clamping surface 116 with a substantially semicircular geometric shape and is secured to upper element 56 with bolts 120A, 120B, 120C, and 120D. Bridge member 112 includes upper notches 122A and 122B, and lower notches 124A and 124B in opposing sides.

Clamping member 114 has a clamping surface 126 with a substantially semicircular geometric shape and is configured to clamp to pipe assembly 34 at the interface of elbow 52 and riser pipe 38. Upper notches 132A and 132B and lower notches 134A and 134B are located in opposing sides of clamping member 114. Upper coupling members 136A and 136B and lower coupling members 138A and 138B couple clamping member 114 to bridging member 112. Particularly, upper coupling member 136A is configured to fit in notches 132A and 122A, and upper coupling member 136B is configured to fit in upper notches 122B and 132B. Lower coupling member 138A (not shown) is configured to fit in notches 124A (not shown) and 134A (not shown), and lower coupling member 138B is configured to fit in notches 124B and 134B. Bolts 140A and 140B secure upper and lower coupling member pairs 136A and 138A, and 136B and 138B respectively.

Clamping member 114 and bridge member 112 include ridges extending from surfaces 116 and 126 and configured to fit in circumferential grooves machined into elbow 52 and riser pipe 38 adjacent to the interface of elbow 52 and riser pipe 38. Also, because of potential out of round conditions, profiling the piping components and custom machining the grooves, as described above in connection with assembly 50, may be desirable.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A clamp apparatus for securing a thermal sleeve and a jet pump riser elbow assembly in a nuclear reactor, an interface weld at the interface between the sleeve and the elbow, the sleeve and elbow having circumferential grooves adjacent to the interface weld, said clamp apparatus comprising:

a lower clamp element configured to be positioned over the interface between the elbow and the thermal sleeve, said lower element comprising extended ridges configured to fit in grooves in the elbow and sleeve, and first and second bolt openings; and an upper clamp element configured to be positioned over the interface between the elbow and the thermal sleeve, and to be coupled to said lower clamp element, said upper element comprising extended ridges configured to fit in grooves in the elbow and sleeve, and first and second bolt openings configured to align with said first and second bolt openings of said lower element.

2. Apparatus in accordance with claim 1 further comprising clamping bolts to clamp said upper element to said lower element, said bolts configured to extend through said aligned bolt openings of said upper and said lower clamp elements.

3. Apparatus in accordance with claim 1 further comprising stop bolts extending from stop bolt sockets in said lower clamp element through stop bolt openings in said upper clamp element, said stop bolts configured to prevent crushing of the thermal sleeve and elbow.

4. Apparatus in accordance with claim 1 wherein said lower clamp element further comprises a groove configured to fit over the interface weld, and said upper clamp element further comprises a groove configured to fit over the interface weld.

5. Apparatus in accordance with claim 2 wherein said upper clamp element further comprises threaded bolt sockets.

6. Apparatus in accordance with claim 5 further comprising an upper elbow clamp coupled to said upper clamp element at said bolt sockets, said upper elbow clamp configured to clamp the jet pump riser elbow and the riser pipe.

7. Apparatus in accordance with claim 6 wherein said upper elbow clamp comprises a bridge member and a clamping member coupled to said bridge member, said clamping member configured to engage the elbow and the riser pipe.

8. Apparatus in accordance with claim 7 wherein the elbow further includes circumferential grooves therein adjacent to the elbow and riser pipe interface, and the riser pipe includes circumferential grooves adjacent to the elbow and riser pipe interface, and said bridge member comprises extended ridges configured to fit in the grooves in the elbow and riser pipe, and said clamping member comprises extended ridges configured to fit in the grooves in the elbow and riser pipe.

9. A clamp apparatus for securing a thermal sleeve, a jet pump riser elbow, and a riser pipe assembly in a nuclear reactor, the elbow and the sleeve having circumferential grooves adjacent to an interface weld between the sleeve and the elbow, and the elbow and the riser pipe having circumferential grooves adjacent to an interface weld between the elbow and the riser pipe, said clamp apparatus comprising a lower clamp assembly and an upper elbow clamp assembly coupled to said lower clamp assembly, said lower clamp assembly comprising a lower clamp element configured to be positioned over the interface between the elbow and the thermal sleeve, said lower element comprising extended ridges configured to fit in the grooves adjacent the elbow and sleeve interface, and first and second bolt openings, said lower clamp assembly further comprising an upper clamp element configured to be positioned over the interface between the elbow and the thermal sleeve, and to be coupled to said lower clamp element, said upper element comprising extended ridges configured to fit in the grooves adjacent the elbow and sleeve interface, and first and second bolt openings configured to align with said first and second bolt openings of said lower element, said upper elbow clamp comprising a bridge member coupled to said upper clamp element and configured to be positioned over the interface between the elbow and the riser pipe, said bridge element comprising extended ridges configured to fit in the grooves adjacent the elbow and riser pipe interface, and a clamping member configured to be positioned over the interface between the elbow and the riser pipe, and to be coupled to said bridge member, said clamping element comprising extended ridges configured to fit in the grooves adjacent the elbow and riser pipe interface.

10. A thermal sleeve, jet pump riser elbow, and clamp assembly for a nuclear reactor, said assembly comprising:

a thermal sleeve;

a jet pump riser elbow joined to one end of said thermal sleeve by an interface weld, said thermal sleeve and said riser elbow comprising circumferential grooves adjacent said interface weld; and a clamp assembly comprising:

a lower clamp element positioned over said interface weld between said elbow and said thermal sleeve, said lower element comprising extended ridges configured to fit in said grooves in said elbow and said sleeve, and first and second bolt openings; and an upper clamp element positioned over said interface weld between the elbow and the thermal sleeve, and coupled to said lower clamp element, said upper element comprising extended ridges configured to fit in grooves in said elbow and said sleeve, and first and second bolt openings configured to align with said first and second bolt openings of said lower element.

11. An assembly in accordance with claim 10 further comprising clamping bolts to clamp said upper element to said lower element, said bolts extending through said aligned bolt openings of said upper and said lower clamp elements.

12. An assembly in accordance with claim 10 further comprising stop bolts extending from stop bolt sockets in said lower clamp element through stop bolt openings in said upper clamp element, said stop bolts configured to prevent crushing of said thermal sleeve and elbow.

13. An assembly in accordance with claim 10 wherein said lower clamp element further comprises a groove configured to fit over said interface weld, and said upper clamp element further comprises a groove configured to fit over said interface weld.

14. An assembly in accordance with claim 11 wherein said upper clamp element further comprises threaded bolt sockets.

15. An assembly in accordance with claim 14 further comprising a jet pump riser pipe and an upper elbow clamp coupled to said upper clamp element at said bolt sockets, said upper elbow clamp configured to clamp said jet pump riser elbow and said riser pipe.

16. An assembly in accordance with claim 15 wherein said upper elbow clamp comprises a bridge member and a clamping member coupled to said bridge member, said clamping member engaging said elbow and said riser pipe.

17. An assembly in accordance with claim 16 wherein said elbow further includes circumferential grooves therein adjacent to an elbow and riser pipe interface, and said riser pipe includes circumferential grooves adjacent to said elbow and riser pipe interface, and said bridge member comprising extended ridges configured to fit in said grooves in said elbow and said riser pipe, and said clamping member comprising extended ridges configured to fit in said grooves in said elbow and said riser pipe.

* * * * *